US011346782B2

(12) United States Patent
Zeng et al.

(10) Patent No.: US 11,346,782 B2
(45) Date of Patent: May 31, 2022

(54) TOMOGRAPHIC IMAGING METHOD

(71) Applicant: Huazhong University of Science and Technology, Wuhan (CN)

(72) Inventors: Shaoqun Zeng, Wuhan (CN); Qingming Luo, Wuhan (CN); Hanqing Xiong, Wuhan (CN); Wenyan Guo, Wuhan (CN); Xiaohua Lv, Wuhan (CN)

(73) Assignee: Huazhong University of Science and Technology, Wuhan (CN)

( * ) Notice: Subject to any disclaimer, the term of this patent is extended or adjusted under 35 U.S.C. 154(b) by 1070 days.

(21) Appl. No.: 15/771,713

(22) PCT Filed: Oct. 20, 2017

(86) PCT No.: PCT/CN2017/106964
§ 371 (c)(1),
(2) Date: Apr. 27, 2018

(87) PCT Pub. No.: WO2018/077114
PCT Pub. Date: May 3, 2018

(65) Prior Publication Data
US 2020/0309697 A1 Oct. 1, 2020

(30) Foreign Application Priority Data
Oct. 31, 2016 (CN) .......................... 201610967373.5

(51) Int. Cl.
*G01N 1/00* (2006.01)
*G01N 21/64* (2006.01)
(52) U.S. Cl.
CPC ..... *G01N 21/6428* (2013.01); *G01N 21/6456* (2013.01); *G01N 2021/6432* (2013.01)

(58) Field of Classification Search
None
See application file for complete search history.

(56) References Cited

U.S. PATENT DOCUMENTS

2010/0330578 A1* 12/2010 Duhr ................ C12Q 2523/313
435/6.11

FOREIGN PATENT DOCUMENTS

| CN | 101042343 A | 9/2007 |
| WO | 2016/145366 A1 | 9/2016 |

OTHER PUBLICATIONS

Office Action dated May 22, 2019, in corresponding Canadian Application No. 3004374, 5 pages.
(Continued)

*Primary Examiner* — Jyoti Nagpaul
(74) *Attorney, Agent, or Firm* — Maier & Maier, PLLC

(57) ABSTRACT

A tomographic imaging method which includes the steps of activating fluorescence in a surface layer of a protein-marked or fluorescent dye-marked biological tissue sample not emitting fluorescence or only emitting specific fluorescence to acquire an activated surface of biological tissue sample; performing fluorescence excitation on the acquired surface biological tissue sample, and imaging the fluorescence to acquire a fluorescence image of the surface layer; cutting off the surface layer; exposing an inactivated new surface layer after cutting the surface layer; repeatedly performing activating, imaging and cutting off steps for the new surface layer to repeat tomographic imaging in such a manner till acquiring a two-dimensional image of each layer of the biological tissue sample; and overlapping the two-dimensional images to acquire a complete three-dimensional image of the biological tissue sample, thus acquiring three-dimensional structure information of the entire sample.

14 Claims, 5 Drawing Sheets

(56) References Cited

OTHER PUBLICATIONS

Office Action dated May 22, 2020, in corresponding Canadian Application No. 3004374, 4 pages.
International Search Report dated Jan. 25, 2018 of corresponding International application No. PCT/CN2017/106964; 5 pgs.
Canadian Office Action dated Jan. 29, 2021, in connection with corresonding CA Application No. 3,004,374 (4 pp.).
Hanqing Xiong, et al., "Chemical reactivation of quenched fluorescent protein molecules enables resin-embedded fluorescence microimaging", Nature Communications, vol. 5, No. 1, Jun. 2, 2014, pp. 1-9 (9 pp).

* cited by examiner

TOMOGRAPHIC IMAGING METHOD

TECHNICAL FIELD

The present invention belongs to the field of bioluminescence microimaging, and particularly relates to a chemically tomographic imaging method, and more particularly, to a rapid imaging method with a tomographic capability by a chemical means.

BACKGROUND

Fluorescence microimaging technology is an indispensable technology in current life science studies. With the developments of molecular biology and the development of fluorescent marking technology, imaging methods for fluorescent biological samples have also been continuously developed.

In the study of life sciences, it is important to acquire a continuous range of fine structure information about biological samples. Early common fluorescence microscopes used wide-field illumination imaging to image biological samples and could only acquire two-dimensional images for thin-section samples. In order to acquire a three-dimensional fine structure of a biological sample, the fluorescence microimaging needs to have a tomographic capability, so that signals from different depths of the sample can be identified.

For a long time, the commonly used tomographic technologies were based on physical principles, which mainly include two types: one is mechanical tomography, in which the sample is cut into a number of slices, and only one layer is imaged at a time, so as to acquire information of each layer. However, this method is complicated to operate, is time-consuming and laborious, and later-stage registration is also quite difficult. The other is optical tomography, which uses optical principles to suppress interference from the outside of an imaging focus plane. For a long time, commonly used imaging methods with optical tomography capability were mainly a confocal microscopy technology and a two-photon microscopy technology; but being limited by the optical principles thereof, both of the two microscopy technologies must use spot-scan imaging; therefore, the imaging speed is limited. On the other hand, the quenching effect of illumination light on the sample fluorescence, in particular the sample fluorescence outside the imaging focus plane, cannot be neglected, and can affect the imaging quality. In the past ten years, light-sheet illumination imaging has been continuously developed, and widely applied gradually as a microimaging technology with optical tomographic capability. The light-sheet illumination imaging technology only illuminates the imaging focus plane rather than illuminating other parts. When acquiring data, a focal-plane imaging mode can be used, which is rapider in speed and smaller in fluorescence quenching while being compared with spot imaging, but the tomographic capability of most light-sheet illumination imaging technologies can only reach to the degree of several micrometers, and the light-sheet illumination technology has higher requirements on sample transparency, and is greatly limited when imaging large samples, especially non-transparent large samples.

In view of the above-mentioned problems, it is necessary to develop a new rapid and efficient high-resolution imaging method with a tomographic capability for biological tissue samples, especially for non-transparent biological tissue samples having a large volume.

SUMMARY

In response to the above defects or improvement needs of the prior art, the present invention provides a tomographic imaging method, the objective of which is to perform fluorescence quenching and reactivation control of some specific protein-marked or fluorescent dye-marked biological tissue samples at a preparing stage and an imaging stage of the samples by a chemical means, and acquire complete three-dimensional structures of the biological samples by combining mechanical cutting and data reconstruction, thereby solving the technical problems that the existing light-sheet illumination tomographic imaging technology has, of low tomographic capability, low axial resolution, slow imaging speed, and the inability to solve three-dimensional stereoscopic imaging of large non-transparent biological samples.

In order to achieve the objective above, according to an aspect of the present invention, a tomographic imaging method is provided, wherein a structure change of a fluorescent chromophoric group in an imaging sample is controlled to quench or activate fluorescence, so that only a fluorescent group in the surface layer of the sample can be excited during imaging, so that only imaging the surface layer of the sample is performed.

Preferably, the tomographic imaging method includes the following steps:

(1) an activating step, including activating surface fluorescence of an original biological tissue sample not emitting fluorescence or an original biological tissue sample only emitting fluorescence with a specific waveband to acquire an activated surface biological tissue sample, wherein the original biological tissue sample is a protein-marked or fluorescent dye-marked biological tissue sample; and (2) an imaging step, including performing fluorescence excitation and fluorescence imaging to the activated surface biological tissue sample acquired in step (1), to acquire a fluorescence image of the activated surface biological tissue sample.

Preferably, the tomographic imaging method further includes: (3) cutting off the activated surface biological tissue sample, and exposing an inactivated new surface layer to acquire a new biological tissue sample, and using the new biological tissue sample in place of the original biological tissue sample;

(4) implementing step (1) until a thickness of the original biological tissue sample is smaller than a thickness of the surface biological tissue sample; and (5) overlapping fluorescence images for each acquired surface biological tissue sample, to acquire a complete three-dimensional image of the original biological tissue sample.

Preferably, the original biological tissue sample not emitting fluorescence includes 1) the protein-marked or fluorescent dye-marked biological tissue sample not emitting fluorescence per se or 2) the protein-marked or fluorescent dye-marked biological tissue sample with fluorescence being reversibly quenched.

Preferably, an axial resolution of the fluorescence image of the biological tissue sample acquired through the tomographic imaging method is of a submicron order.

Preferably, the protein includes a fluorescent protein and/or a protein which can excite fluorescence by combining with a ligand.

Preferably, the method of reversibly quenching the fluorescence includes a method of reversibly quenching a fluorescent group of the fluorescent protein or fluorescent dye by steeping in a chemical reagent.

Preferably, the method of reversibly quenching the fluorescence is to use an acid chemical reagent for quenching processing, use a transition metal ion compound solution for quenching processing, or use a hydrogen ion and a transition metal ion for synergetic quenching processing.

Preferably, the activating processing method comprises chemical reagent processing or photochemical processing, so that the protein or the fluorescent dye in the surface layer of the biological tissue sample is activated, while the protein or the fluorescent dye under the surface layer of the sample is not activated.

Preferably, the chemical reagent processing method comprises steeping the protein-marked or fluorescent dye-marked biological tissue sample in the chemical reagent with the surface layer of the sample being permeated by the chemical reagent only, so that only the fluorescence in the surface layer of the sample is activated.

Preferably, the chemical reagent processing method is alkaline solution activating processing, metal ion chelating agent activating processing, or synergetic activating processing of an alkaline solution and a metal ion chelating agent.

Preferably, the photochemical processing method comprises using light with a specific waveband to activate and the activating light can only penetrate the surface layer of the protein-marked or fluorescent dye-marked biological tissue sample, so that only the fluorescence in the surface layer of the sample is activated.

In general, the following beneficial effects can be achieved by comparing the technical solutions above conceived in the present invention with the prior art.

(1) when the tomographic imaging method of the present invention is used in the tomographic imaging of a biological sample, only surface layer fluorescence of the sample is activated during activation, and the thickness of the activated surface layer is namely the axial resolution of the tomographic imaging; the tomographic imaging effect is good, and submicron axial resolution can be acquired;

(2) according to the tomographic imaging method of the present invention, since the fluorescence of the protein or the fluorescent dye is eliminated before fluorescence imaging, or the protein or fluorescent dye not emitting fluorescence or not emitting the fluorescence with a specific waveband is used, only the fluorescence in the surface layer of the sample is activated during activation, and there is no interference of background fluorescence when exciting and performing fluorescence imaging in the surface layer, a focal-plane imaging mode can be used to acquire imaging data in a high-throughput manner, and the imaging speed is rapid;

(3) the tomographic imaging method of the present invention uses the steps of activating-imaging-cutting off without being limited by the size of the sample while imaging and has no requirements on the transparency of the sample; the method can be used in imaging of samples with various volumes and transparencies, and the high-throughput advantage of the method is more apparent while being used in imaging of a large sample, which shortens the imaging time; and (4) by reversibly quenching the fluorescent group in the sample in advance and then only activating the surface fluorescence of the sample during imaging, the tomographic imaging method of the present invention prevents inactivated fluorescence from being quenched by the illumination light during imaging, and will not affect the imaging quality due to the light quenching effect during long-time imaging.

BRIEF DESCRIPTION OF THE DRAWINGS

FIG. 9(A) is a fluorescence intensity of Embodiment 2 before being embedded by a resin; FIG. 9(B) is a fluorescence intensity of Embodiment 2 after being embedded by the resin and before being activated by the alkaline solution; and FIG. 9(C) is a fluorescence intensity after being embedded by the resin and after being activated by the alkaline solution; wherein, a scale in FIG. 9 represents 50 μm;

FIG. 10 is a three-dimensional diagram of a partial brain area of a mouse in Embodiment 3 and a two-dimensional diagram showing marked details, wherein FIG. 10A is a three-dimensional diagram of a certain neure, FIG. 10B is a two-dimensional diagram of the neure, FIG. 10C shows an axon and an axon bouton, and FIG. 10D shows a dendrite and a dendritic spine of the neure;

FIG. 11(A) is the excited fluorescence intensity before being activated in Embodiment 4; and FIG. 11(B) is the excited fluorescence intensity after being activated in Embodiment 4, wherein an optical wavelength excited is 405 nm; wherein a scale in FIG. 11 represents 20 μm;

FIG. 12(A) is an excited fluorescence intensity before being activated in Embodiment 5; and FIG. 12(B) is the excited fluorescence intensity after being activated in Embodiment 5;

FIG. 13(a) is a quenched image of the brain tissue of the mouse immunohistochemically marked by the Alexa 488 fluorescent dye molecule, a contrast ratio of which is increased by 10 times; and FIG. 13(b) is a reactivated image of the brain tissue of the mouse immunohistochemically marked by the Alexa 488 fluorescent dye molecule.

14(b) is a fluorescence reactivated image of the brain tissue of the mouse marked by the DsRed.

DETAILED DESCRIPTION

To make the objectives, technical solutions, and advantages of the present invention clearer, the present invention is further described in detail with reference to the drawings and the embodiments. It should be understood that the specific embodiments described herein are only used to explain the present invention, but are not intended to limit the present invention. In addition, the technical features involved in the various embodiments of the present invention described hereinafter can be combined with each other as long as they do not constitute a conflict with each other.

The present invention provides a tomographic imaging method, wherein a structure change of a fluorescent chromophoric group in an imaging sample is controlled to quench or activate fluorescence, so that only a fluorescent group in a surface layer of the sample can be excited during imaging, with the result of only imaging the surface layer of the sample.

Figure 1:
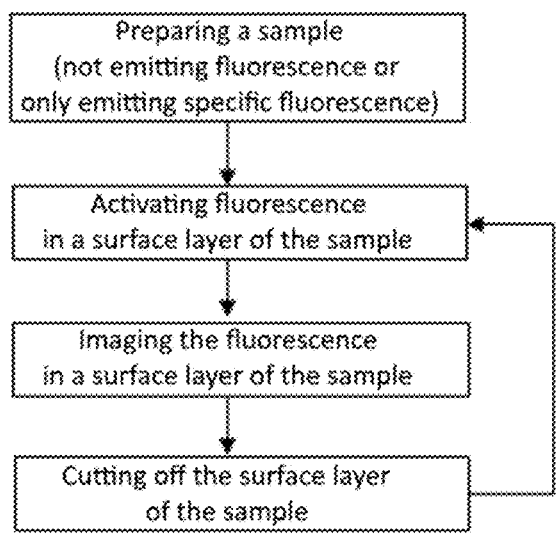
FIG. 1 is a flow chart of a tomographic imaging method according to the present invention.

FIG. 1 is a flow chart of a tomographic imaging method according to the present invention, and the tomographic imaging method provided by the present invention comprises the following steps:

(1) preparing a sample, including marking a biological tissue sample not emitting fluorescence or only emitting specific fluorescence by a protein or fluorescent dye;

(2) an activating step, including activating surface fluorescence of an original biological tissue sample not emitting fluorescence or only emitting fluorescence with a specific waveband to acquire an activated surface biological tissue sample;

(3) an imaging step, including performing fluorescence excitation and fluorescence imaging to the activated surface biological tissue sample acquired in step (2), to acquire a fluorescence image of the activated surface biological tissue sample;

(4) cutting off the activated surface biological tissue sample, and exposing an inactivated new surface layer to acquire a new biological tissue sample, and using the new biological tissue sample as the original biological tissue sample;

(5) implementing step (2) until a thickness of the original biological tissue sample is smaller than a thickness of the surface biological tissue sample; and (6) overlapping fluorescence images of each acquired biological tissue samples in the surface layer, to acquire a complete three-dimensional image of the original biological tissue sample.

Wherein, the protein includes a fluorescent protein and/or a protein which can be combined with a ligand to excite out fluorescence, the fluorescent protein is preferably a pH-sensitive fluorescent protein, a pH-stable fluorescent protein and/or a photo-controlled fluorescent protein, and the fluorescent dye is preferably an organic fluorescent dye molecule. The pH-sensitive fluorescent protein includes a jellyfish-derived green fluorescent protein and derivatives, mOrange and derivatives, or mApple and derivatives; the green fluorescent protein and derivatives may be BFP, EBFP, EBFP2, CFP, ECFP, GFP, EGFP, YFP or EYFP, and preferably EGFP or EYFP; and the mApple and derivatives may be a red fluorescent protein pHuji.

The photo-controlled fluorescent protein includes one or more of photoactivatable FPs (Photoactivatable FPs, PAFPs), such as PAGFP, PAmCherry1, etc.; or one or more of photoswitchable FPs (photoswitchable FPs, rsFPs), such as Dendra2, mEos3.1, etc.

The organic fluorescent dye molecule is preferably an Alexa series fluorescent dye molecule, and is preferably one or more of Alexa 488, Alexa 514, Alexa 532 and/or Alexa 546.

The pH-stable fluorescent protein is preferably a red fluorescent protein DsRed.

The protein or fluorescent dye used for marking the biological tissue is a protein or fluorescent dye not emitting fluorescence or only emitting fluorescence with a specific waveband, or a protein or fluorescent dye with fluorescence being reversibly quenched.

The photo-controlled fluorescent protein not emitting fluorescence or only emitting fluorescence with a specific waveband may be directly subjected to surface layer activating step without being processed.

For a protein or fluorescent dye which emits fluorescence by itself, the fluorescence thereof is reversibly quenched firstly. The method for the fluorescence being reversibly quenched includes a method of reversibly quenching a fluorescent group of the fluorescent protein or fluorescent dye by steeping in a chemical reagent, and preferably uses an acid chemical reagent for processing, use a transition metal ion compound solution for processing, or use a hydrogen ion and a transition metal ion for synergetic quenching.

Figure 2:
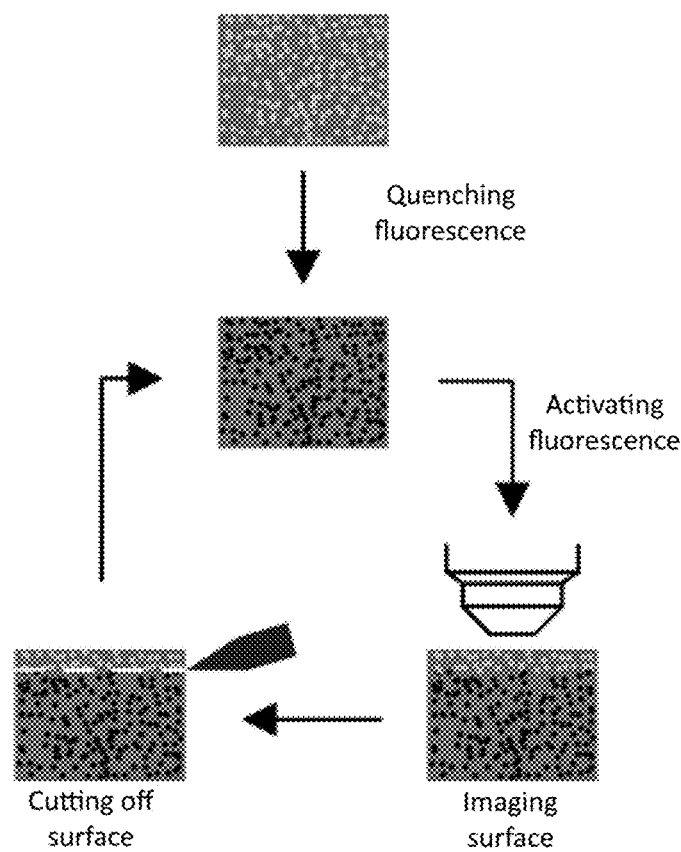
FIG. 2 is a flow chart of a quenching-imaging-cutting off tomographic imaging method according to the present invention.

FIG. 2 is a flow chart of a quenching-imaging-cutting off tomographic imaging method according to the present invention. For tomographic imaging to a biological tissue sample the fluorescence of a protein or fluorescent dye of which needs to be firstly quenched, as shown in FIG. 2, the fluorescence of the sample is firstly quenched while preparing the sample to make the sample not emit fluorescence, then a surface layer is activated, imaged and cut off, and then the procedures of activating the surface layer-imaging the surface layer-cutting are circulated as such, till the sample imaging is completed, to acquire a complete image of the biological tissue sample.

The activating processing method includes chemical reagent processing or photochemical processing, so that the fluorescent protein or the fluorescent dye in the surface layer of the biological tissue sample is activated, while the protein or the fluorescent dye under the surface layer of the sample is not activated.

The chemical reagent processing method includes steeping the protein-marked or fluorescent dye-marked biological tissue sample in the chemical reagent with the surface layer of the sample being permeated by the chemical reagent only, so that only the fluorescence in the surface layer of the sample is activated. The activating chemical reagent is preferably alkaline solution activating, metal ion chelating agent activating or synergetic activating of alkaline solution and metal ion chelating agent.

The photochemical method includes using light with a specific waveband to activate and the activating light can only penetrate through the surface layer of the protein-marked or fluorescent dye-marked biological tissue sample, so that only the fluorescence in the surface layer of the sample is activated. The protein or the fluorescent dye may not emit fluorescence or may only emit fluorescence with a certain color originally, and may be excited by light with another wavelength to emit fluorescence with another color after being activated by the activating light with a specific wavelength.

When a photo-controlled fluorescent protein is used to mark the biological tissue sample, the photo-controlled fluorescent protein in a surface layer of a biological tissue-embedded sample may be activated by the activating light on a non-imaging light path, and then the fluorescent protein may be excited and imaged by using exciting light with a corresponding wavelength on an imaging light path. The imaging light path receives a light path emitting a spectrum (i.e., fluorescence signal), and the non-imaging light path refers to other light path excluding the imaging light path. The term "activating" may be described as follows: the photo-controlled fluorescent protein scarcely emits fluorescence with a certain waveband under the excitation of the exciting light with a specific wavelength, and only after being activated by the "activating light" with another certain wavelength, the fluorescent protein is enabled and excited by the exciting light with a specific wavelength so as to emit fluorescence. The term "exciting" refers to a process by which a fluorescent protein absorbs light with a certain wavelength to emit fluorescence. The photoactivatable fluorescent protein does not emit fluorescence per se, and, only when the surface layer of the sample is activated by the activating light with a specific wavelength, the activated fluorescence in the surface layer can perform fluorescence imaging under the excitation of the exciting light with another specific wavelength; while the photoswitchable fluorescent protein only emits fluorescence with a certain color itself, after the surface layer of the sample is activated by the activating light with a specific wavelength, the activated fluorescence in the surface layer performs fluorescence imaging under the excitation of the exciting light with another wavelength.

The activating light can only activate the surface layer of the sample; compared with the exciting light, the wavelength of the activating light is generally shorter, and the capability of penetrating the tissue is poorer; therefore, the activating light can only penetrate through and activate the fluorescent protein in the surface layer; the activation of the activating light can control an angle between the activating light and the activated sample: the smaller the angle is, the stronger the surface reflection is; in this way, it is not only the case that little activating light enters a deep layer, but also that the energy density of light entering the sample becomes low. Therefore, the photo-controlled fluorescent protein in the surface layer of the sample is activated by the activating light on the non-imaging light path of the sample according to the present invention, and then the activating light with a corresponding wavelength is used to activate the fluorescent protein on the imaging light path and perform fluorescence imaging, thus realizing imaging the surface layer of the sample. The activating light is an activating light with a specific wavelength matched with the photo-controlled fluorescent protein. The exciting light is an exciting light with a specific wavelength matched with the photo-controlled fluorescent protein. An included angle between a direction of the activating light and a direction of the exciting light is 0 to 90°, and is preferably 60 to 75°. The activated thickness of the surface layer of the sample may be controlled by optimizing the included angle between the activating light and the exciting light and optimizing the wavelength of the activating light, i.e., selecting a proper activating direction, and the activated thickness of the surface layer of the sample is an axial resolution of the fluorescence image of the sample.

When the pH-sensitive fluorescent protein is used to mark the biological tissue embedded sample, an acid liquor or chemical reagent may be added to make the pH of the solution range from 3 to 5, so as to quench the pH-sensitive fluorescent protein. Then the sample with quenched fluorescence may be steeped in an alkaline solution during activating, thus chemically reactivating the fluorescence of the pH-sensitive fluorescent protein in the surface layer of the sample. A pH value of the alkaline solution ranges from 8 to 13, and preferably ranges from 11 to 12, and the alkaline solution is preferably a sodium carbonate solution, an organic amine solution, ammonium hydroxide or a mixture thereof.

When the alkaline solution is used for the activation step, only a cut plane of the sample, i.e., a surface layer of a mechanically cut surface, is activated; it is very difficult for the alkaline solution to permeate into other non-mechanically cut surfaces since they are very smooth and have very large surface tension. In addition, a hydrophobic substance coating may further be added into the non-mechanically cut surfaces to prevent the alkaline solution from permeating into the sample from the non-mechanically cut surfaces.

A type and a viscosity of the alkaline solution, a type of an embedding medium, and a ratio of each component and other factors all affect a permeability speed of the alkaline solution on the mechanically cut surfaces of the embedded sample. An axial resolution of the fluorescence imaging is controlled by controlling a proper permeability speed of the alkaline solution to realize high-resolution rapid imaging.

When an organic fluorescent dye molecule is used to mark a biological tissue, a transition metal ion and the organic fluorescent dye molecule are used to form a hexatomic ring to reduce a conjugate 7E electron density of the organic fluorescent molecule, thus quenching the fluorescence marked by the organic fluorescent dye molecule on the biological tissue, wherein the quenching is controllable and reversible. Then, a chelating agent and the metal ion are used to form a coordination bond; the combining capacity thereof is larger than a binding force between the metal ion and the organic fluorescent molecule, thus damaging the combination of the metal ion and the organic fluorescent molecule, recovering a conjugate π electron structure thereof, and reactivating the fluorescence of the organic fluorescent dye molecule, wherein the reactivation is convenient and has good effect, and a brightness of the fluorescence quenched and reactivated can be accurately controlled according to needs. A transition metal ion compound is preferably one or more compounds of $Cr^{2+}$, $Mn^{2+}$, $Fe^{2+}$, $Fe^{3+}$, $Co^{2+}$, $Ni^{2+}$, $Cu^+$ and/or $Cu^{2+}$. The metal ion chelating agent is one or more of EDTA-$Na_4$, 8-hydroxyquinoline, N-oleoylsarcosine, 2-ethylenediamine and/or desferrioxamine chelating agent, and is preferably desferrioxamine or EDTA-$Na_4$.

When a pH-insensitive fluorescent protein, for example, a red fluorescent protein DsRed is used to mark the biological tissue, a synergistic effect of the transition metal ion and a hydrogen ion is used to quench the fluorescence of the DsRed-marked biological tissue, and a synergistic effect of the metal ion chelating agent and a hydroxyl ion is used to reactivate the fluorescence of the biological tissue with quenched fluorescence, thus accurately controlling the fluorescence of the DsRed-marked biological tissue.

An activated thickness of the surface layer of the biological tissue sample corresponds to an axial resolution during tomographic imaging, and a chemical reagent is used for reactivation, wherein a type and a viscosity of the chemical reagent, a type of an embedding medium while embedding the biological tissue, and a ratio of each component and other factors all affect a permeability speed of the chemical reagent on the mechanically cut surfaces of the embedded sample. The activating time is controlled by controlling a permeability speed of the chemical reagent in the surface of the sample to control an axial resolution of the fluorescence imaging, thus allowing high-resolution rapid imaging.

After the surface layers of various protein-marked or fluorescent dye-marked biological tissue samples are activated, a laser corresponding to an exciting wavelength of the sample is used as an exciting light source to irradiate on the surface of the sample through an objective lens after beam shaping, and excited fluorescence is collected by using the same objective lens. Since the fluorescence in a deep layer of the sample cannot be excited, interference of an axial background is avoided during imaging; therefore, an optical system without tomographic capability can be used for imaging, such as wide-field imaging, time-delay integral imaging, etc.

The tomographic imaging method provided by the present invention may be deemed as a chemical tomographic imaging method, wherein the structure change of the fluorescent chromophoric group in the imaging sample is controlled to quench or activate fluorescence, so that only the fluorescent group in the surface layer of the sample can be excited during imaging, thus providing for imaging of only the surface layer of the sample.

Figure 3:
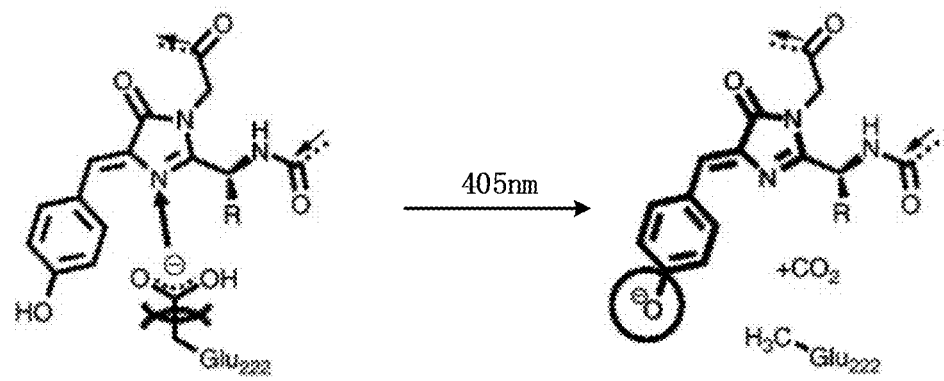
FIG. 3 is a principle diagram of a photoactivation process of a photoactivatable fluorescent protein PAGFP.
Figure 4:
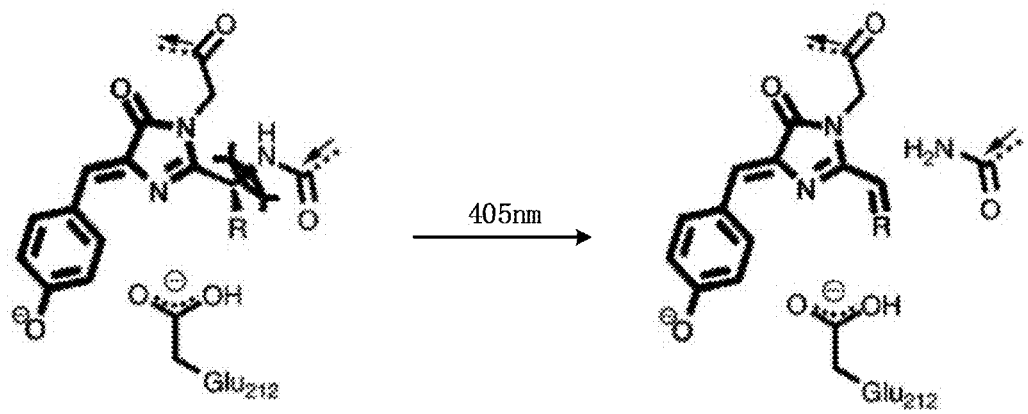
FIG. 4 is a principle diagram of a photoswitching process of a photoswitchable fluorescent protein mEos 3.1.

PAGFP (Photoactivatable Green Fluorescent Protein) is a typical photoactivatable fluorescent protein, the activating process of which is irreversible. Before being activated, the protein does not emit fluorescence basically while being irradiated by exciting light (with a wavelength of 488-515 nm in general); after being activated by ultraviolet light (with a wavelength of 405 nm in general), a chromophoric group is deprotonated and enters a state capable of emitting fluorescence, a fluorescence intensity of the state is enhanced by about 100 times before being activated, and this process is as shown in FIG. 3.

mEosFP is a typical photoswitchable fluorescent protein; taking a mEos 3.1 as an example, under an inactivated state, the mEos 3.1 can be excited to emit green fluorescence, after being irradiated by ultraviolet light (with a wavelength of 405 nm in general), a specific chemical bond in the fluorescent molecule will crack, which causes irreversible photoswitching, and the green fluorescence is switched into red fluorescence, and this process is as shown in FIG. 4.

Figure 5:
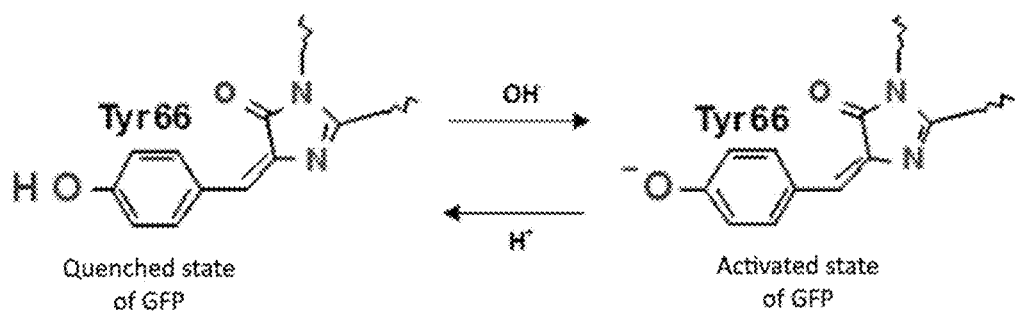
FIG. 5 is a principle diagram of a fluorescence quenching and activating process of a pH-sensitive fluorescent protein EGFP.

EGFP (Enhanced Green Fluorescent Protein) is a typical pH-sensitive fluorescent protein. A GFP chromophoric group in an acid environment is protonated under the effect of a hydrogen ion, and the GFP in this state is hardly to emit fluorescence under the excitation of the exciting light; however, when the protonated GFP is placed in an alkaline environment, the chromophoric group will be deprotonated due to the existence of a hydroxyl ion, and at the moment, the GFP may be excited to emit fluorescence normally. This process is a reversible process, which is as shown in FIG. 5.

Figure 6:
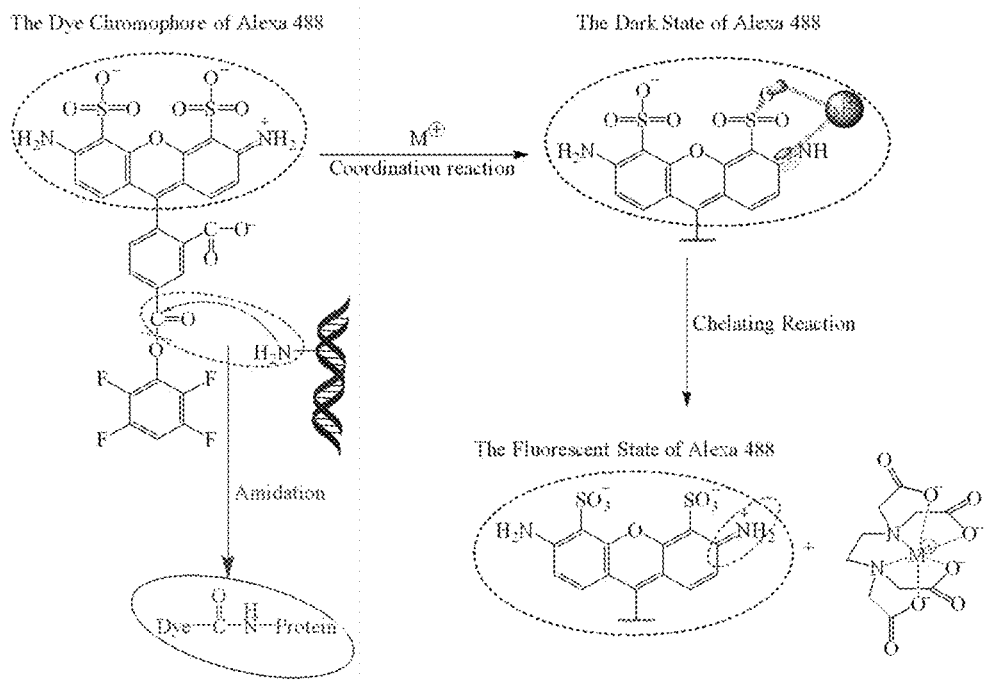
FIG. 6 is a principle diagram of a fluorescence quenching and activating process of an organic fluorescent dye molecule Alexa 488.

Taking an Alexa 488 organic fluorescent molecule dye as an example, a molecule configuration of a chromophoric group of an Alexa 488 fluorescent dye molecule may be changed into a form incapable of emitting fluorescence by excitation under the effect of a transition metal ion; while when a metal ion chelating agent is used to process the fluorescent dye molecule under an inactivated state, a metal ion will be seized by the chelating agent, which enables the chromophoric group to be restored to the form capable of emitting fluorescence. The process is as shown in FIG. 6.

Figure 7:
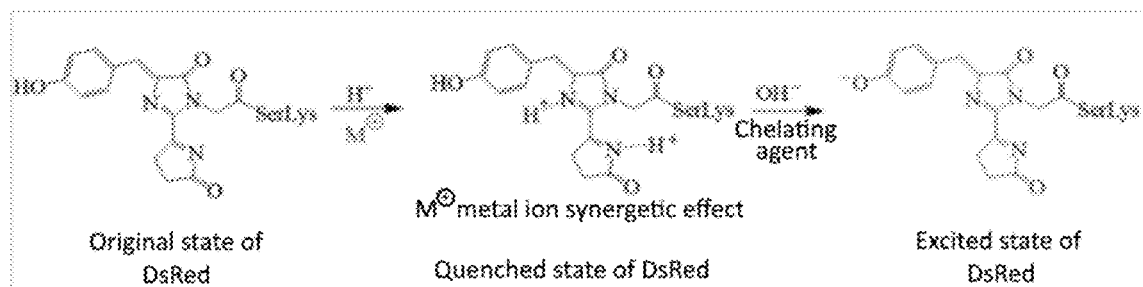
FIG. 7 is a principle diagram of a fluorescence quenching and activating process of a pH-stable fluorescent protein DsRed.

A DsRed is a pH-stable fluorescent protein, a chromophoric group of the DsRed is reversibly changed under the common effect of a transition metal ion and a hydrogen ion, and cannot be excited to emit fluorescence under this form; when being processed by an alkalinous metal chelating agent, the chromophoric group may be restored to return to the form capable of emitting fluorescence, and this process is as shown in FIG. 7.

The tomographic imaging method of the present invention is intended to eliminate background fluorescence during imaging by a certain means before imaging, for example, the fluorescent protein-marked or the fluorescent dye-marked biological tissue sample is steeped by a chemical reagent; the fluorescent chromophoric group of the sample is changed and quenched, wherein the quenching is reversible, and the quenched fluorescence can be reactivated during activating. Only the surface layer is activated by using the activating chemical reagent during activating, after the fluorescence of the surface layer is activated, the surface layer imaging is free of background interference during the activation and fluorescence imaging since the fluorescence under the surface layer is not activated, and is still in a quenched state.

When the biological tissue sample is marked by some proteins, such as a photo-controlled fluorescent protein, only the surface layer is activated during the activation step since the photo-controlled fluorescent protein does not emit fluorescence itself or only emits fluorescence with a certain wavelength; when the surface layer is activated and fluorescence imaging is performed, after the surface layer only emitting fluorescence with a specific wavelength is activated, and then the activated surface layer is excited by the exciting light with another specific wavelength, the wavelength of the fluorescence under the surface layer has a different scope from that of the wavelength of the fluorescence in the surface layer; therefore, the background interference problem does not exist.

The tomographic imaging method of the present invention acquires the high-resolution fluorescence image by controlling the activated thickness of the surface layer of the sample, wherein an axial resolution thereof is of a submicron order, and a resolution scope ranges from 500 to 2000 nm.

Since background fluorescence interference does not exist, the tomographic imaging method of the present invention can perform focal-plane imaging, acquire high-throughput fluorescence imaging data, has a rapid imaging speed, has no limitation to the volume and transparency of the biological tissue sample, and the high-throughput advantage of the method is more apparent when used in imaging of a biological tissue sample, which shortens the imaging time. Since the tomographic imaging method of the present invention reversibly quenches the fluorescent group in the sample in advance and only activates the fluorescence in the surface layer of the sample during imaging, the inactivated fluorescence is protected from being quenched by the illumination light during imaging, and the imaging quality cannot be affected by the light quenching effect during long-time imaging.

The biological tissue sample of the present invention may be a biological tissue-embedded sample which is embedded with a resin.

Cutting off the surface layer of the sample may be performed by cutting off the surface layer of the sample in a mechanically cut manner. The cutting system is a surface cutting means capable of performing super thin-cutting, i.e., capable of cutting within a thickness of 10 μm, and is preferably vibration cutting or diamond cutter cutting.

The imaging system of the present invention may be any imaging system used in three-dimensional imaging, and is preferably a wide-field imaging system to image a movable sample.

The embodiments are as follows.

Embodiment 1

Chemically tomographic imaging for a whole brain of a Thy1-EGFP-M mouse includes the following steps:

(1) Fixation of the Sample.

The whole brain of a Thy1-EGFP-M mouse was fixed by a chemical fixation means to acquire a fixed biological brain tissue of the mouse. The specific steps were as follows:

The whole brain that had been dissected from the mouse was steeped in a PFA solution with a mass fraction of 4% for 12 h after heart perfusion at 4° C. The dosage of the PFA solution was 20 ml per brain. Then the brain was rinsed by a PBS solution three times; 40 ml PBS solution per brain was used to rinse for 4 h each time.

(2) Dehydration of the Sample.

The fixed brain tissue of the mouse was replaced by ethyl alcohol to dehydrate the biological tissue, so as to acquire the dehydrated EGFP-marked whole brain of the mouse. The specific steps were as follows.

The fixed whole brain of the mouse was steeped in 20 ml gradient ethyl alcohol double distilled water solution in sequence for 2 h at 4° C. to perform dehydration. Concentration gradients of the ethyl alcohol double distilled water solution were 50%, 75%, 95%, 100% and 100% by volume percent of ethyl alcohol.

(3) Permeation of Embedding Medium and Fluorescence Quenching Processing.

The dehydrated whole brain of the mouse was permeated by an HM20 embedding medium to acquire the whole brain of the mouse filled by a working solution of the HM20 embedding medium. The specific steps were as follows.

The dehydrated whole brain of the mouse was permeated by the embedding medium by passing through more than 5 ml xylene solution with a gradient of HM20 in sequence at 4° C. Gradients of the HM20 in xylene solution were 50%, 75%, 100%, 100%, 100% and 100% by volume percent of HM20. The brain was steeped for 2 h in each of the former three gradients, steeped for 24 h respectively in the fourth group and the fifth group, and steeped for 14 h in the sixth group (before the brain was steeped in the sixth group, a resin working solution was added with acetic acid for mixing, wherein each 5 ml resin working solution was added with 25 to 30 μL acetic acid), so that the pH of the resin working solution was 3.5 to 4.0.

(4) Aggregation of the Embedding Medium.

The HM20 embedding medium was subjected to a polymerization reaction to acquire a resin-embedded sample of the EGFP-marked biological tissue. The specific steps were as follows: 1.1 mL working solution of the HM20 embedding medium mixed with acetic anhydride was injected into a gelatin capsule with a caliber of 9 mm installed in a base, then the whole brain of the mouse (filled by the working solution of the HM20 embedding medium) was placed in the capsule, the position of the whole brain was adjusted and a cover of the capsule was closed, then the capsule was brought into a vacuum drying box to perform gradient heating aggregation for 12 h at 37° C., 3 h at 42° C., 12 h at 45° C. and 3 h at 50° C.

(5) Reactivation of pH-Sensitive Fluorescent Protein by Alkaline Solution

The resin-embedded sample of the whole brain of the mouse was steeped in 0.05 mol/L sodium carbonate solution with a pH value of 11.2. The permeability speed of the alkaline solution in the resin-embedded sample of the whole brain of the mouse was about 1 μm/min to acquire an activated surface layer.

(6) Fluorescence Micro-Optical Tomography

Figure 8:
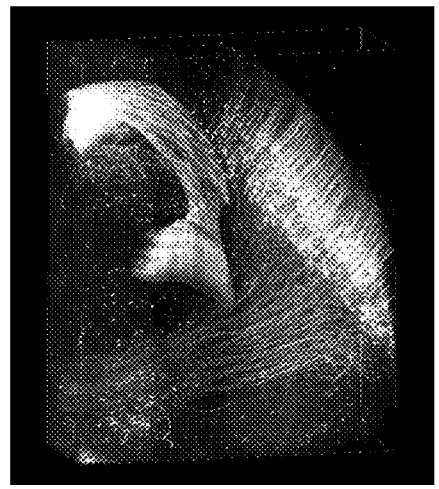
FIG. 8 is a three-dimensional diagram of a partial brain area of a mouse in Embodiment 1.

Fluorescence imaging of the activated surface layer was excited, the activated surface layer imaged was mechanically cut, a new surface layer was exposed to contact with the alkaline solution, then the fluorescence of the new surface layer was reactivated and imaging was excited, then the new surface layer was repeatedly cut, activated and imaged, for repeating tomographic imaging as such until all the two-dimensional images of the entire sample were acquired. The acquired two-dimensional images were automatically registered to acquire a three-dimensional image of the sample (as shown in FIG. 8). From FIG. 8, a spine, an axon bouton (axon bouton) and other submicrometer structures of a neure could be clearly distinguished, a single axon could be distinguished from a dense neuron axon fiber group, and a complete projection form of the neure could be traced.

Embodiment 2

A chemically tomographic imaging method of a whole brain of a mouse over-expressing a pH-sensitive fluorescent protein pHuji included the following steps.

(1) Fixation of the Sample.

The whole brain of a mouse over-expressing pHuji was fixed by a chemical fixation means to acquire a fixed pHuji-marked biological tissue. The specific steps were as follows: the whole brain that had been dissected from the mouse was steeped in a PFA solution with a mass fraction of 4% for 12 h after heart perfusion at 4° C. The dosage of the PFA solution was 20 ml per brain. Then the brain was rinsed by a PBS solution three times. 40 ml PBS solution per brain was used to rinse for 4 h each time.

(2) Dehydration of the Sample.

The fixed pHuji-marked whole brain of the mouse was replaced by ethyl alcohol to dehydrate the biological tissue, so as to acquire the dehydrated pHuji-marked whole brain of the mouse. The specific steps were as follows: the fixed pHuji-marked whole brain of the mouse was steeped in 20 ml gradient ethyl alcohol double distilled water solution in sequence for 2 h at 4° C. to perform dehydration. Concentration gradients of the ethyl alcohol double distilled water solution were 50%, 75%, 95%, 100% and 100% by volume percent of ethyl alcohol.

(3) Permeation of Embedding Medium and Fluorescence Quenching Processing.

The dehydrated pHuji-marked whole brain of the mouse was permeated by an HM20 embedding medium to acquire the pHuji-marked whole brain of the mouse filled by a working solution of the HM20 embedding medium. The specific steps were as follows: the dehydrated pHuji-marked whole brain of the mouse was permeated by the embedding medium by passing through more than 5 ml xylene solution with a gradient of HM20 in sequence at 4° C. Gradient of the HM20 in xylene solution were 50%, 75%, 100%, 100%, 100% and 100% by volume percent of HM20, the brain was steeped for 2 h in each of the former three gradients, steeped for 24 h respectively in the fourth group and the fifth group, and steeped for 14 h in the sixth group (before the brain was steeped in the sixth group, a resin working solution was added with acetic acid for mixing, wherein each 5 ml resin working solution was added with 25 to 30 μL acetic acid), so that the pH of the resin working solution was 4.5 to 5.0.

(4) Aggregation of Embedding Medium.

The HM20 embedding medium was subjected to a polymerization reaction to acquire a resin-embedded sample of the pHuji-marked biological tissue. The specific steps were as follows: 1.1 mL working solution of the HM20 embedding medium mixed with acetic anhydride was injected into a gelatin capsule with a caliber of 9 mm installed in a base, then the pHuji-marked whole brain of the mouse filled by the working solution of the HM20 embedding medium was placed in the capsule, the position of the whole brain was adjusted and a cover of the capsule was closed, then the capsule was brought into a vacuum drying box to perform gradient heating aggregation for 12 h at 37° C., 3 h at 42° C., 12 h at 45° C. and 3 h at 50° C.

(5) Reactivation of pH-Sensitive Fluorescent Protein by Alkaline Solution

The resin-embedded sample of the whole brain of the mouse was steeped in 0.1 mol/L sodium carbonate solution with a pH value of 11.6, the permeability speed of the alkaline solution in the resin-embedded sample of the whole brain of the mouse was about 1 μm/min to acquire an activated surface layer, and the thickness of the activated surface layer was 0.5 to 1 μm.

Figure 9:
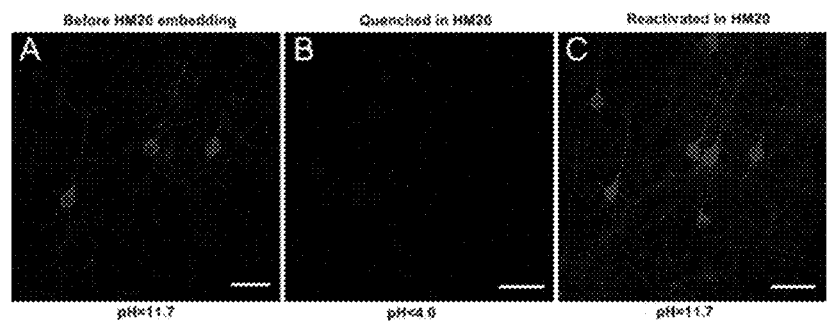
FIG. 9 is a comparison diagram of fluorescence intensities before and after being activated by an alkaline solution in a Embodiment 2.

A laser device was used to activate the fluorescent protein on the sample surface activated by alkaline solution to perform the fluorescence imaging. Fluorescence intensities before and after being activated by the alkaline solution were shown in FIG. 9. FIG. 9 was a comparison diagram of fluorescence intensities before and after being activated by the alkaline solution in Embodiment 2; FIG. 9A was a fluorescence intensity of Embodiment 2 before being embedded by a resin; FIG. 9B was a fluorescence intensity of Embodiment 2 after being embedded by the resin and before being activated by the alkaline solution; and FIG. 9C was a fluorescence intensity after being embedded by the resin and after being activated by the alkaline solution. It could be seen that the resin-embedded sample after quenching processing hardly emits fluorescence, and after the sample was activated by the alkaline solution, the fluorescence intensity was well restored.

(6) Fluorescence Micro-Optical Tomography

Fluorescence imaging of the activated surface layer was excited, the activated surface layer imaged was mechanically cut, a new surface layer was exposed to contact with the alkaline solution, then the fluorescence of the new surface layer was reactivated and imaging was performed, then the new surface layer was repeatedly cut, activated and imaged, for repeating tomographic imaging as such until all the two-dimensional images of the entire sample were acquired. The acquired two-dimensional images were automatically registered to acquire a three-dimensional image of the sample, and a z-direction resolution was 0.5 to 1 μm.

Embodiment 3

A chemically tomographic imaging method of a whole brain of a mouse over-expressing EYFP included the following steps.

(1) Fixation of the Sample.

The whole brain of a mouse over-expressing EYFP was fixed by a chemical fixation means to acquire a fixed biological brain tissue of the mouse. The specific steps were as follows: the whole brain that had been dissected from the mouse was steeped in a PFA solution with a mass fraction of 4% for 12 h after heart perfusion at 4° C. A dosage of the PFA solution was 20 ml per brain. Then the brain was rinsed by a PBS solution three times; 40 ml PBS solution per brain was used to rinse for 4 h each time.

(2) Dehydration of the Sample.

The fixed brain tissue of the mouse was replaced by ethyl alcohol to dehydrate the biological tissue, so as to acquire the dehydrated EGFP-marked whole brain of the mouse. The specific steps were as follows: the fixed whole brain of the mouse was steeped in 20 ml gradient ethyl alcohol double distilled water solution in sequence for 2 h at 4° C. to perform dehydration. Concentration gradients of the ethyl alcohol double distilled water solution were 50%, 75%, 95%, 100% and 100% by volume percent of ethyl alcohol.

(3) Permeation of Embedding Medium and Fluorescence Quenching Processing.

The dehydrated whole brain of the mouse was permeated by an HM20 embedding medium to acquire the whole brain of the mouse filled by a working solution of the HM20 embedding medium. The specific steps were as follows: the dehydrated whole brain of the mouse was permeated by the embedding medium by passing through more than 5 ml xylene solution with a gradient of HM20 in sequence at 4° C. Gradients of the HM20 in xylene solution were 50%, 75%, 100%, 100%, 100% and 100% by volume percent of HM20 brain was steeped for 2 h in each of the former three gradients, steeped for 24 h respectively in the fourth group and the fifth group, and steeped for 14 h in the sixth group (before the brain was steeped in the sixth group, a resin working solution was added with acetic acid for mixing, wherein each 5 ml resin working solution was added with 25 to 30 μL acetic acid), so that the pH of the resin working solution was 4.0 to 4.5.

(4) Aggregation of Embedding Medium.

The HM20 embedding medium was subjected to a polymerization reaction to acquire a resin-embedded sample of the EYFP-marked biological tissue. The specific steps were as follows: 1.1 mL working solution of the HM20 embedding medium mixed with acetic anhydride was injected into a gelatin capsule with a caliber of 9 mm installed in a base, then the whole brain of the mouse (filled by the working solution of the HM20 embedding medium) was placed in the capsule, the position of the whole brain was adjusted and a cover of the capsule was closed, then the capsule was brought into a vacuum drying box to perform gradient heating aggregation for 12 h at 37° C., 3 h at 42° C., 12 h at 45° C. and 3 h at 50° C.

(5) Reactivation of pH-Sensitive Fluorescent Protein by Alkaline Solution

The resin-embedded sample of the whole brain of the mouse was steeped in a mixed solution of sodium carbonate and glycerinum with a pH value of 11.2, wherein the concentration of the sodium carbonate was 0.05 mol/L, and the volume percentage of the glycerinum was 20%. The permeability speed of this kind of mixed alkaline solution in the resin-embedded sample of the whole brain of the mouse was about 0.5 μm/min to acquire an activated surface layer, and the thickness of the activated surface layer was 0.5 to 1 μm.

(6) Fluorescence Micro-Optical Tomography

Figure 10:
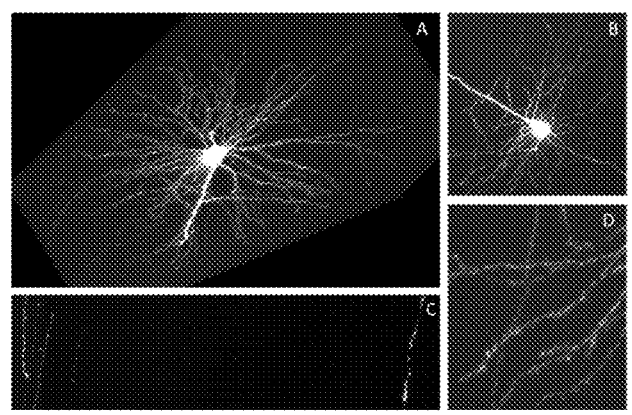

Fluorescence imaging of the activated surface layer was excited, then the activated surface layer imaged was mechanically cut, a new surface layer was exposed to contact with the alkaline solution, then the fluorescence of the new surface layer was reactivated and imaging was excited, then the new surface layer was repeatedly cut, activated and imaged, for repeating tomographic imaging as such until all the two-dimensional images of the entire sample were acquired. The acquired two-dimensional images (FIG. 10B) were automatically registered to acquire a three-dimensional image of the sample (as shown in FIG. 10A). From FIG. 10, a spine (FIG. 10D), an axon bouton (FIG. 10C) and other submicrometer structures of a neure could be clearly distinguished, and a z-direction resolution was about 0.5 to 1 μm.

Embodiment 4

Photochemically activated imaging of whole brain of a mouse with an Rv-dg-mEos3.1 injected in cerebral cortex.

mEos3.1 is a common photoswitchable fluorescent protein. The photochemical property thereof was as follows: before being activated by a 405 nm ultraviolet wavelength, only green fluorescence (488 nm activating wavelength) was emitted and no red fluorescence was emitted; and after being activated by 405 nm ultraviolet wavelength for a short time, and under 561 nm exciting light, red fluorescence (an emission spectrum was above 550 nm) was emitted.

A chemically tomographic imaging method of the whole brain of the mouse with the Rv-dg-mEos3.1 injected in the cerebral cortex included the following steps.

(1) Fixation of the Sample.

The whole brain of the Rv-dg-mEos3.1-infected mouse was fixed by a chemical fixation means to acquire a fixed mEos3.1-marked biological tissue. The specific steps were as follows: the whole brain that had been dissected from the mouse was steeped in a PFA solution with a mass fraction of 4% for 12 h after heart perfusion at 4° C., a dosage of the PFA solution was 20 ml per brain, then the brain was rinsed by a PBS solution for three times, 40 ml PBS solution per brain was used to rinse for 4 h each time.

(2) Dehydration of the Sample.

The fixed mEos3.1-marked whole brain of the mouse was replaced by ethyl alcohol to dehydrate the biological tissue, so as to acquire the dehydrated mEos3.1-marked whole brain of the mouse. The specific steps were as follows: the fixed mEos3.1-marked whole brain of the mouse was steeped in 20 ml gradient ethyl alcohol double distilled water solution in sequence for 2 h at 4° C. to perform dehydration. Concentration gradients of the ethyl alcohol double distilled water solution were 50%, 75%, 95%, 100% and 100% by volume percent of ethyl alcohol.

(3) Permeation Processing of Embedding Medium

The dehydrated mEos3.1-marked whole brain of the mouse was permeated by an HM20 embedding medium to acquire the mEos3.1-marked whole brain of the mouse filled by a working solution of the HM20 embedding medium. The specific steps were as follows: the dehydrated mEos3.1-marked whole brain of the mouse was permeated by the embedding medium by passing through more than 5 ml xylene solution with a gradient of HM20 in sequence at 4° C. Gradients of the HM20 in xylene solution were 50%, 75%, 100%, 100%, 100% and 100% by volume percent of HM20, the brain was steeped for 2 h in each of the former three gradients, steeped for 24 h respectively in the fourth group and the fifth group, and steeped for 14 h in the sixth group.

(4) Aggregation of Embedding Medium.

The HM20 embedding medium was subjected to a polymerization reaction to acquire a resin-embedded sample of the mEos3.1-marked biological tissue. The specific steps were as follows: 1.1 mL working solution of the HM20 embedding medium was injected into a gelatin capsule with a caliber of 9 mm installed in a base, then the mEos3.1-marked whole brain of the mouse filled by the working solution of the HM20 embedding medium was placed in the capsule, the position of the whole brain was adjusted and a cover of the capsule was closed, then the capsule was brought into a vacuum drying box to perform gradient heating aggregation for 12 h at 37° C., 3 h at 42° C., 12 h at 45° C. and 3 h at 50° C.

(5) Activation and Excitation of Photo-Controlled Fluorescent Protein

Figure 11:
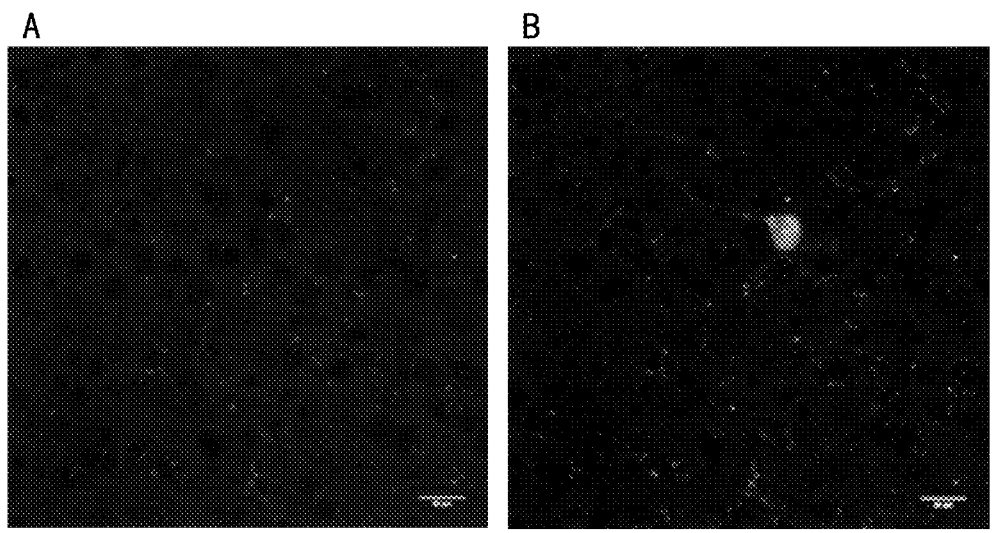
FIG. 11 is a comparison diagram of fluorescence intensities before and after being activated and excited by a photo-controlled fluorescent protein used in Embodiment 4.

The processed sample was fixed in an imaging system, a diamond cutter in the system was used to cut the sample to a position to be imaged, and the imaging system was adjusted to a best imaging state; activating light with 405 nm wavelength was used to illuminate the sample, the sample was moved to enable the activating light to cover the entire surface of the sample, the illumination of the activating light could activate the fluorescence in the surface layer of the sample, and the fluorescence intensities before and after being activated and excited by the activating light were as shown in FIG. 11. FIG. 11 is a comparison diagram of fluorescence intensities before and after being activated and excited by the photo-controlled fluorescent protein; FIG. 11A is the excited fluorescence intensity before being activated; and FIG. 11B is the excited fluorescence intensity after being activated. It could be seen that the sample before being activated had no fluorescence signal basically, after being activated, a neure body can be observed, which indicated that the fluorescent protein in the surface layer of the sample was activated after the illumination of the activating light, and the thickness of the activated surface layer was 1 to 2 μm.

Then 561 nm exciting light was used to excite fluorescence and perform imaging, and an included angle between the direction of the activating light and the direction of the exciting light was 60°. The sample surface was imaged by a wide-field imaging mode, and the sample was moved to acquire the image of the entire surface of the sample.

(6) Fluorescence Micro-Optical Tomography

After the surface imaging was finished, the sample was moved below the diamond cutter and subjected to cutting, the imaged surface was cut off to expose the new surface layer, then the photo-controlled fluorescent protein of the new surface layer was reactivated and fluorescence imaging was excited, then the new surface layer was repeatedly cut, activated and imaged, for repeating tomographic imaging as such until all the two-dimensional images of the entire sample were acquired. The acquired two-dimensional images were automatically registered to acquire a three-dimensional image of the sample, and a z-direction resolution was 1 to 2 μm.

Embodiment 5

A post-embedment chemically tomographic imaging method of Hela cells over-expressing PAGFP included the following steps.

(1) Fixation of the Sample.

Hela cells over-expressing PAGFP were fixed by a chemical fixation means to acquire a fixed PAGFP-marked biological tissue. The specific steps were as follows: the Hela cell was steeped in a PFA solution with a mass fraction of 4% for 12 h at 4° C., then the Hela cell was rinsed by a PBS solution three times; 40 ml PBS solution per tissue was used to rinse for 1 h each time.

(2) Dehydration of the Sample.

The fixed PAGFP-marked Hela cell was replaced by ethyl alcohol to dehydrate the sample, so as to acquire the dehydrated PAGFP-marked cell sample. The specific steps were as follows: the fixed PAGFP-marked Hela cell was steeped in 20 ml gradient ethyl alcohol double distilled water solution in sequence for 2 h at 4° C. to perform dehydration. Concentration gradients of the ethyl alcohol double distilled water solution were 50%, 75%, 95%, 100% and 100% by volume percent of ethyl alcohol.

(3) Permeation Processing of Embedding Medium

A dehydrated PAGFP-marked whole brain of a mouse was permeated by an HM20 embedding medium to acquire the PAGFP-marked cell sample filled by a working solution of the HM20 embedding medium. The specific steps were as follows: the dehydrated PAGFP-marked Hela cell was permeated by the embedding medium by passing through more than 5 ml xylene solution with a gradient of HM20 in sequence at 4° C. Gradients of the HM20 in xylene solution were 50%, 75%, 100%, 100%, 100% and 100% by volume percent of HM20, the cell sample was steeped for 2 h in each of the former three gradients, steeped for 24 h respectively in the fourth group and the fifth group, and steeped for 14 h in the sixth group.

(4) Aggregation of Embedding Medium.

The HM20 embedding medium was subjected to a polymerization reaction to acquire a PAGFP-marked and resin-embedded cell sample. The specific steps were as follows: the working solution of the HM20 embedding medium was dropped on a slide growing with the Hela cell, then a cover glass was covered on the slide to be brought into a vacuum drying box to perform gradient heating aggregation for 12 h at 37° C., 3 h at 42° C., 12 h at 45° C. and 3 h at 50° C.

(5) Activation and Excitation of Photo-Controlled Fluorescent Protein

Figure 12:
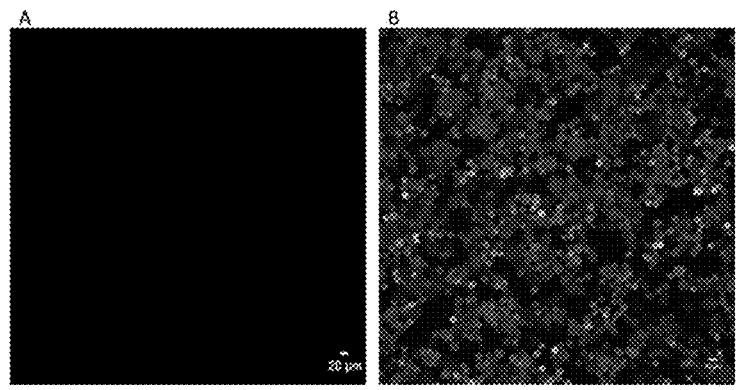
FIG. 12 is a comparison diagram of fluorescence intensities before and after being activated and excited by a photo-controlled fluorescent protein used in Embodiment 5.

The surface layer of the resin-embedded Hela cell sample was activated by the laser having 405 nm activating light, then the laser having 504 nm exciting light excited the fluorescence and performed the imaging, and an included angle between the direction of the activating light and the direction of the exciting light was 75°. That was, the included angle between the direction of the activating light and the direction of the upper surface of the sample was 15°, and the brightness of the fluorescence before and after activating processing by the activating was as shown in FIG. 12 (FIG. 12A and FIG. 12B). After the PAGFP was activated and excited by a laser device, the brightness of the fluorescence was obviously increased from little fluorescence to where all the PAGFP-expressed cells were very bright, and the thickness of the activated surface layer was 1 to 2 um.

(6) Fluorescence Micro-Optical Tomography

After the surface imaging was finished, the sample was moved below the diamond and cut, the imaged surface was cut to expose the new surface layer, then the photo-controlled fluorescent protein of the new surface layer was activated and fluorescence imaging was excited, then the new surface layer was repeatedly cut, activated and imaged, for repeating tomographic imaging as such until all the two-dimensional images of the entire sample were acquired. The acquired two-dimensional images were automatically registered to acquire a three-dimensional image of the sample, and an axial resolution was 1 to 2 μm.

Embodiment 6

Tomographic imaging of brain of a mouse marked by a fluorescent dye Alexa488.

The steps were as follows.

(1) The perfused brain of the mouse was fixed by 4% PFA solution and was rinsed by a PBS solution.

(2) The fixed and rinsed brain tissue of the mouse was immunohistochemically marked by the Alexa 488 and was rinsed by the PBS solution.

(3) The Alexa 488-marked sample was quenched by 100 mM $FeCl_3$ water solution for 20 min, so that Alexa 488 fluorescence was substantially completely quenched.

(4) The quenched sample was embedded to acquire the sample that could be used for imaging.

(5) The sample was fixed in an imaging system, a diamond cutter in the system was used to cut the sample to the position to be imaged, the imaged sample and the front end of an imaging objective lens were steeped in 200 mM EDTA-Na4 water solution, and a focus plane was adjusted to the sample surface. For the sample steeped in EDTA-$Na_4$ water solution, the fluorescent dye in the surface layer thereof could be reactivated, and the activated thickness of the surface layer was 0.5 to 1 μm.

Figure 13:
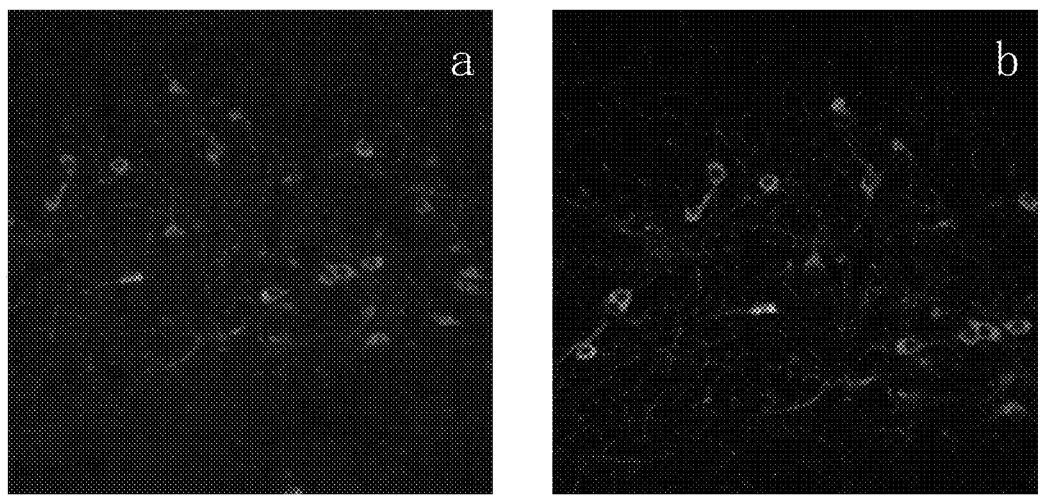
FIG. 13 shows quenched-activated imaging of a brain tissue of a mouse immunohistochemically marked by an Alexa 488 fluorescent dye molecule in Embodiment 6.

The brightness of fluorescence after fluorescence quenching and activating processing was as shown in FIG. 13 respectively. A contrast ratio of the image after fluorescence quenching was amplified by 10 times; as shown in FIG. 13a, after the activating processing, the fluorescence intensity (FIG. 13b) was equal to the effect after the contrast ratio of the fluorescence intensity before being activated was amplified by 10 times (FIG. 13a). That was, the activating processing enhanced the fluorescence intensity by 10 times or above, which guaranteed that the fluorescence could be used for further imaging.

(6) The surface of the sample was imaged by a wide-field imaging mode, and the sample was moved to acquire the image of the entire surface of the sample.

(7) After the surface imaging was finished, the sample was moved below the diamond cutter and cut. After the imaged surface was cut off, the new surface exposed was exposed and contacted with a sodium carbonate solution, and the quenched fluorescence of the new surface was restored.

(8) Steps (6) and (7) were repeated to acquire a series of two-dimensional images of the sample, the acquired images could be reconstructed to acquire a three-dimensional fluorescence image of the sample, and an axial resolution can be 0.5 to 1 μm.

Embodiment 7

Chemically tomographic imaging of a brain sample of a mouse marked by a pH-stable fluorescent protein (non-pH-sensitive fluorescent protein) DsRed.

The steps were as follows.

(1) The mouse brain tissue marked by the fluorescent protein DsRed was fixed by 4% PFA solution and was rinsed by 0.9% NaCl solution.

(2) The fixed and rinsed DsRed-marked sample was quenched by 100 mM CuSO4 solution.

(3) The quenched sample was embedded to acquire the sample that could be used for imaging.

(4) The DsRed-marked sample processed was fixed in an imaging system, a diamond cutter in the system was used to cut the sample to a position to be imaged, the imaged sample and the front end of an imaging objective lens were steeped in 200 mM EDTA-Na4 water solution, and a focus plane was adjusted to the sample surface. For the sample steeped in EDTA-$Na_4$ water solution, the fluorescent protein in the surface layer thereof could be reactivated, and the activated thickness of the surface layer was 0.5 to 1 μm.

Figure 14:
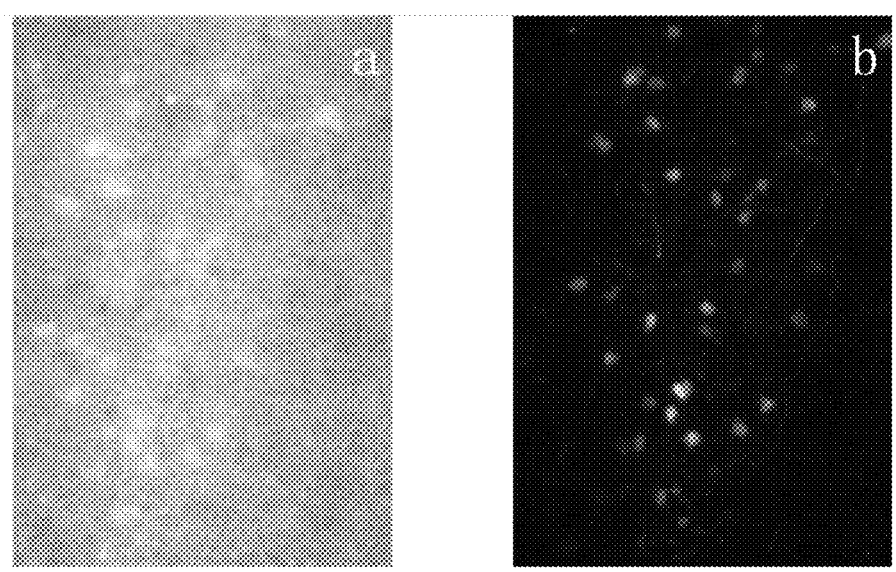
FIG. 14 shows fluorescence quenched-activated imaging of a brain tissue of a mouse marked by a DsRed in Embodiment 7; 14(a) is a fluorescence quenched image of the brain tissue of the mouse marked by the DsRed, a contrast ratio of which is increased by 100 times; and FIG.

The brightness of the fluorescence after fluorescence quenching and activating processing was as shown in FIG. 14 respectively. A contrast ratio of the image after fluorescence quenching was amplified by 100 times; as shown in FIG. 14a, after the activating processing, the fluorescence intensity (FIG. 13b) was equal to the effect after the contrast ratio of the fluorescence intensity before being activated was amplified by 10 times (FIG. 13a). That was, the activating processing enhanced the fluorescence intensity by 10 times or above, which guaranteed that the fluorescence could be used for further imaging. The contrast ratio of the image after fluorescence quenching was amplified about 100 times, the processed image was shown in FIG. 14a, a fluorescence signal of the sample after being quenched could only be indistinctly seen after being amplified by 100 times, while a fluorescence signal of the sample reactivated (FIG. 14b) could be easily displayed in a background which was very dark, the fluorescence had a high contrast ratio, and could be used for further imaging.

(5) The sample surface was imaged by a wide-field imaging mode, and the sample was moved to acquire the image of the entire surface of the sample.

(6) After the surface imaging was finished, the sample was moved below the diamond cutter and cut. After the imaged surface was cut off, the new surface exposed was contacted with sodium carbonate solution, and the quenched fluorescence of the new surface was restored.

(7) Steps (5) and (6) were repeated to acquire a series of two-dimensional images of the sample, the acquired images could be reconstructed to acquire a three-dimensional fluorescence image of the sample, and the axial resolution can be 0.5 to 1 µm.

Those skilled in the art can easily understand that the above description is only the preferred embodiments of the present invention, but is not intended to limit the present invention, and any modifications, equivalent replacements, and improvements made within the spirit and principle of the present invention shall all fall within the scope of protection of the present invention.

The invention claimed is:

1. A tomographic imaging method, comprising:
providing a sample having a solid structure comprising a surface layer and a volume under the surface layer;
controlling a structure change of a fluorescent chromophoric group in an imaging sample to quench or activate fluorescence,
wherein controlling the structure change comprises exciting only a fluorescent group in the surface layer of the sample during imaging and avoiding excitation of the volume under the surface layer, and
imaging only the surface layer of the sample.

2. The tomographic imaging method according to claim 1, comprising:
(1) an activating step comprising activating fluorescence in a surface layer of an original biological tissue sample not emitting fluorescence or an original biological tissue sample only emitting fluorescence with a specific waveband to acquire an activated surface biological tissue sample, wherein the original biological tissue sample is a protein-marked or fluorescent dye-marked biological tissue sample; and
(2) an imaging step comprising performing fluorescence excitation and fluorescence imaging to the activated surface biological tissue sample acquired in step (1), to acquire a fluorescence image of the activated surface biological tissue sample.

3. The tomographic imaging method according to claim 2, wherein the tomographic imaging method further comprises:
(3) cutting off the activated surface biological tissue sample and exposing an inactivated new surface layer to acquire a new biological tissue sample, and using the new biological tissue sample as the original biological tissue sample;
(4) implementing step (1) until a thickness of the original biological tissue sample is smaller than a thickness of the surface biological tissue sample; and (5) overlapping fluorescence images for each acquired surface biological tissue sample, to acquire a complete three-dimensional image of the original biological tissue sample.

4. The tomographic imaging method according to claim 3, wherein an axial resolution of the fluorescence image of the biological tissue sample acquired through the tomographic imaging method is of a submicron order.

5. The tomographic imaging method according to claim 2, wherein the original biological tissue sample not emitting fluorescence comprises 1) the protein-marked or fluorescent dye-marked biological tissue sample not emitting fluorescence per se or 2) the protein-marked or fluorescent dye-marked biological tissue sample with fluorescence being reversibly quenched.

6. The tomographic imaging method according to claim 5, wherein an axial resolution of the fluorescence image of the biological tissue sample acquired through the tomographic imaging method is of a submicron order.

7. The tomographic imaging method according to claim 5, wherein the method for the fluorescence being reversibly quenched comprises a method of reversibly quenching a fluorescent group of the fluorescent protein or fluorescent dye by steeping in a chemical reagent; and the method for the fluorescence being reversibly quenched comprises an acid chemical reagent for quenching processing, use a transition metal ion compound solution for quenching processing, or use a hydrogen ion and a transition metal ion for synergetic quenching processing.

8. The tomographic imaging method according to claim 2, wherein an axial resolution of the fluorescence image of the biological tissue sample acquired through the tomographic imaging method is of a submicron order.

9. The tomographic imaging method according to claim 2, wherein the protein comprises a fluorescent protein and/or a protein which can excite fluorescence by combining with a ligand to.

10. The tomographic imaging method according to claim 2, wherein the activating processing method comprises chemical reagent processing or photochemical processing, so that the protein or the fluorescent dye in the surface layer of the biological tissue sample is activated, while the protein or the fluorescent dye under the surface layer of the sample is not activated.

11. The tomographic imaging method according to claim 10, wherein the chemical reagent processing method comprises steeping the protein-marked or fluorescent dye-marked biological tissue sample in the chemical reagent with the surface layer of the sample being permeated by the chemical reagent only, so that only the fluorescence in the surface layer of the sample is activated.

12. The tomographic imaging method according to claim 11, wherein the chemical reagent processing method is alkaline solution activating processing, metal ion chelating agent activating processing, or synergetic activating processing of alkaline solution and metal ion chelating agent.

13. The tomographic imaging method according to claim 10, wherein the photochemical processing method comprises using the light with a specific waveband to activate and the activating light can only penetrate the surface layer of the protein-marked or fluorescent dye-marked biological tissue sample, so that only the fluorescence in the surface layer of the sample is activated.

14. The tomographic imaging method according to claim 1, wherein an axial resolution of the fluorescence image of the biological tissue sample acquired through the tomographic imaging method is of a submicron order.

* * * * *